UNITED STATES PATENT OFFICE.

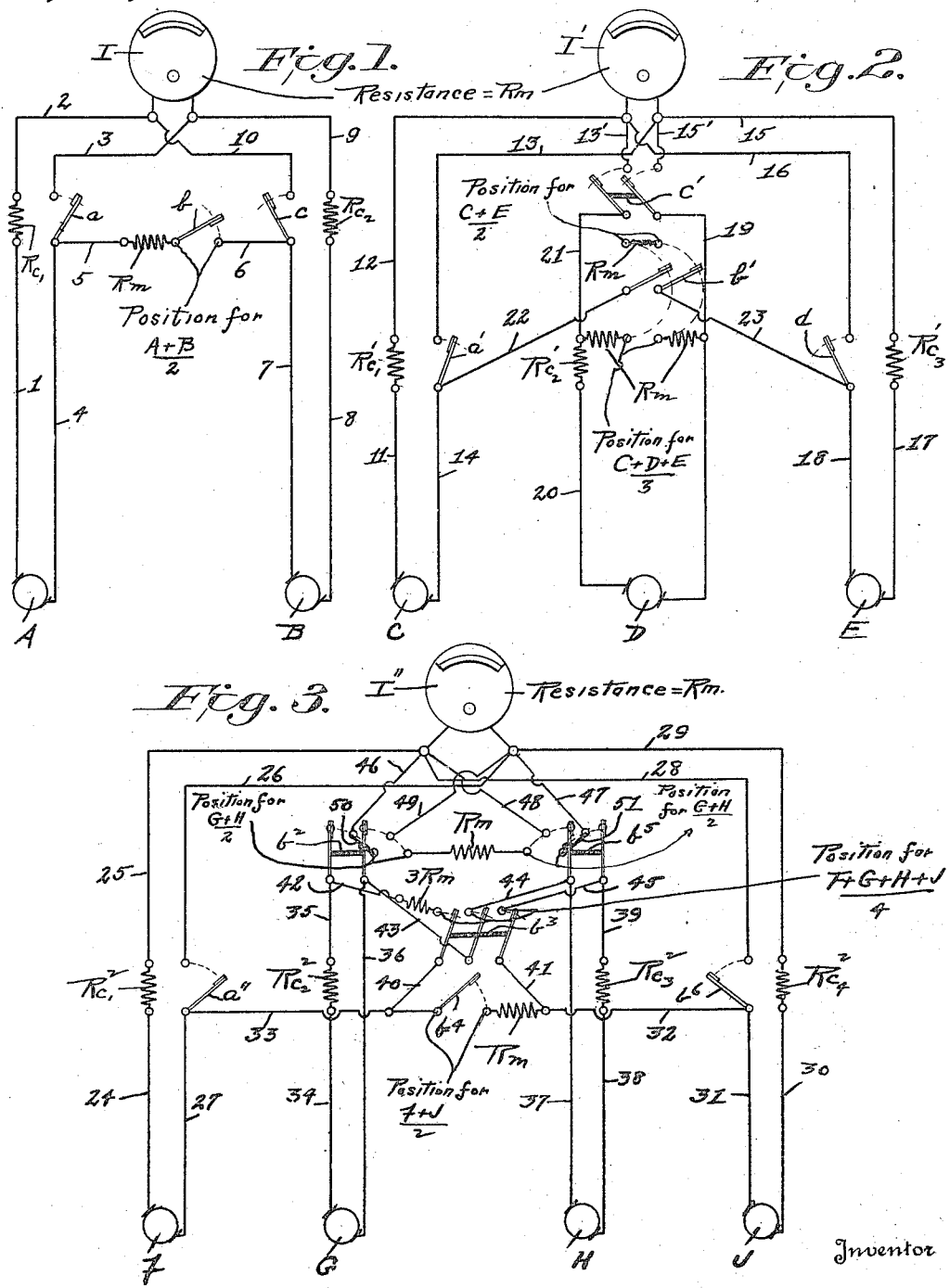

PETRUS van SANTEN KOLFF, OF PHILADELPHIA, PENNSYLVANIA, ASSIGNOR TO THE ELECTRIC TACHOMETER CORPORATION, OF PHILADELPHIA, PENNSYLVANIA, A CORPORATION OF DELAWARE.

SIGNALING APPARATUS.

1,242,816.      Specification of Letters Patent.      Patented Oct. 9, 1917.

Application filed November 16, 1916. Serial No. 131,698.

*To all whom it may concern:*

Be it known that I, PETRUS VAN SANTEN KOLFF, a citizen of the United States, residing at Philadelphia, in the county of Philadelphia and State of Pennsylvania, have invented certain new and useful Improvements in Signaling Apparatus, of which the following is a specification.

This invention relates to signaling apparatus and is particularly applicable where the speed of one shaft or the average speed of a plurality of shafts is to be indicated, through electrical mechanism, upon one or more indicating instruments.

An object of the invention is to provide circuit connections whereby the speed of each shaft may be separately indicated upon a single instrument, or upon a plurality of instruments.

A further object is to provide means whereby the average speed of various combinations of rotating shafts may be separately indicated upon a single instrument, or upon a plurality of instruments.

A further object is to provide means whereby the average speed of the whole system of shafts may be indicated upon a single instrument or upon a plurality of instruments.

The invention is illustrated by electrical circuit diagrams, in the drawings in which, Figure 1 is a view illustrating the connections when the system comprises two shafts;

Fig. 2 is a view illustrating the connections when the system comprises three shafts; and Fig. 3 is a view illustrating the connections when the system comprises four shafts.

It is to be understood however, that the principle of the invention may be equally applicable, without any marked modifications thereof, to any number of shafts in a system.

In Fig. 1, in which a two-shaft system is illustrated, the magnetos A and B, which must be interchangeably adjusted, both as to electrical output and internal resistance, are connected to the rotating shafts, A being connected to the indicating mechanism I by means of wire 1, calibrating resistance $Rc_1$, wire 2, wire 3, switch $a$, and wire 4. Magneto B is connected to indicator I by wire 7, switch $c$, wire 10, wire 9, calibrating resistance $Rc_2$, and wire 8. Shunted across between wires 4 and 7, below switches $a$ and $c$, is a circuit containing wire 5, resistance $Rm$, switch $b$, and wire 6. The resistance $Rm$ is equal to that of the resistance $Rm$ of the indicator I.

To indicate the speed of A, switch $a$ only is closed, the various resistances being so proportioned as to give the proper deflection on indicator I. To indicate the speed of B, switch $c$ only is closed. To indicate the average speed of A and B, switch $b$, only, is closed. It will be readily apparent that when switch $b$ is closed, the indicator I, and magnetos A and B are connected in series, and that if resistance $Rm$ in circuit 5, 6, were absent, the potential impressed on indicator I would be the sum of the potentials of A and B. Therefore to insert in the circuit another resistance $Rm$ equal to that of the indicator I is to halve the voltage impressed thereon and therefore the impressed voltage will be that of $$\frac{A+B}{2}$$

and the reading will represent the average speed of the two shafts.

On the same principle, it will be seen that to read the average speed of three shafts, when connected in series, it would be only necessary to insert two resistances of the value $Rm$, in addition to that of the indicator I. Likewise for the average reading of four shafts three additional resistances are necessary. Such variations of circuits for three and four shafts are shown in Figs. 2 and 3 respectively.

In Fig. 2, magneto C, which is interchangeable as to electrical output and internal resistance with magnetos D and E, is connected to indicator I′ by wire 11, calibrating resistance $R'c_1$, wire 12, wire 13, switch $a'$, and wire 14. Magneto D is connected to indicator I′ by wire 20, calibrating resistance $R'c_2$, wire 21, double pole switch $c'$, wire 13′, wire 15′, switch $c'$, and wire 19. Magneto E is connected to indicator I′ by wire 18, switch $d$, wire 16, wire 15, calibrating resistance $R'c_3$, and wire 17. Shunted across between wires 14 and 18 below switches $a'$ and $d$ are wires 22 and 23 which are connected to a double throw double pole switch $b'$. By throwing the switch $b'$ up a single resistance $Rm$ is inserted between wires 14 and 18. By throwing switch $b'$ down a resistance $Rm$ is inserted between wire 14 and 20 and a resistance $Rm$ is inserted between wire 18 and 19. To indicate the speed of magneto C, switch $a'$ only is closed. To indicate the speed of magneto D the switch $c'$ only is closed. To indicate the speed of magneto E switch $d$ only is closed. To indicate the average speed of magnetos C and E switch $b'$ only is thrown upward. To indicate the average speed of magnetos C, D and E the switch $b'$ only is thrown downward.

In Fig. 3, magneto F, interchangeable as to electrical output and internal resistance to magnetos G, H and J, is connected to indicator I'' by wire 24, calibrating resistance $R^2c_1$, wire 25, wire 26, switch $a''$ and wire 27. Magneto G is connected to indicator I'' by wire 34, calibrating resistance $R^2c_2$, wire 35, double pole double throw switch $b^2$, wire 46, wire 49, and wire 36. Magneto H is connected to indicator I'' by wire 37, double pole double throw switch $b^5$, wire 48, wire 47, wire 39, calibrating resistance $R^2c_3$ and wire 38. Magneto J is connected to indicator I'' by wire 31, switch $b^6$, wire 28, wire 29, calibrating resistance $R^2c_4$ and wire 30. Shunted across between wires 27 and 31 below switches $a''$ and $b^6$ is a circuit containing switch $b^4$ and resistance $Rm$. A three pole single throw switch $b^3$ is shunted across between wires 27 and 31 by wires 33, 40, 41 and 32.

To indicate the average speed of F and J switch $b^4$ only is closed. To indicate the average reading of G and H the switches $b^2$ and $b^5$ only are moved to their extreme position of movement whereby a resistance $Rm$, shunted across between the two inner points of switches $b^2$ and $b^5$ is inserted between wires 36 and 37. To indicate the average speed of shafts F G H and J switch $b^3$ only is closed which inserts a resistance $3 Rm$ in series with the magnetos and the indicator I''. The speed of any one shaft is ascertainable by closing its particular switch.

While the invention has been described as applicable to the determination of shaft speeds, as on a vessel provided with a multiplicity of shafts, it is obviously capable of use for affording indications of other functions, such as the voltage, of a series of electrical generators. This invention has been found to be particularly applicable on board vessels, where the vessel is divided up into several separate water-tight compartments and enables the engineer in one compartment to have knowledge of the speed of propeller shafts in otherwise inaccessible compartments.

I claim:—

1. Indicating apparatus comprising a plurality of generators, an electrical indicator, circuit means for separately and independently indicating a function of each generator upon the indicator, and circuit means for indicating the average of a function of said generators upon the indicator.

2. Indicating apparatus comprising a plurality of generators, an electrical indicator, circuit means for separately and independently indicating a function of each generator upon the indicator, circuit means for indicating the average of a function of certain pairs of generators, and circuit means for indicating the average of a function of all the generators.

3. Indicating apparatus comprising a plurality of generators, an electrical indicator having a predetermined resistance, circuit means for separately and independently indicating a function of each generator upon said indicator, and circuit means for connecting the generators and the indicator in series with a resistance equivalent in amount to that of the indicator multiplied by a number one less than the number of generators in circuit, to indicate the average of their functions.

4. Indicating apparatus comprising a plurality of generators, an electrical indicator having a predetermined resistance, circuit means for separately and independently indicating a function of each generator upon said indicator, circuit means for connecting certain pairs of generators and the indicator in series with a resistance equivalent to that of the indicator, and circuit means for connecting the generators and the indicator in series with a resistance equivalent in amount to that of the indicator multiplied by a number one less than the number of generators in circuit, to indicate the average of their functions.

5. Indicating apparatus comprising a plurality of generators, an electrical indicator having a predetermined resistance, circuit means for connecting predetermined combinations of said generators and the indicator in series with a resistance equivalent in amount to that of the indicator multiplied by a number one less than the number of generators of the particular combination in circuit, to indicate the average of their functions.

In testimony whereof I affix my signature.

PETRUS van SANTEN KOLFF.

Copies of this patent may be obtained for five cents each, by addressing the "Commissioner of Patents, Washington, D. C."